United States Patent [19]

Kennedy et al.

[11] Patent Number: 5,642,451
[45] Date of Patent: Jun. 24, 1997

[54] FIBEROPTIC CABLE JUNCTION

[75] Inventors: Paul G. Kennedy; Willard Stevenson, both of San Dego, Calif.

[73] Assignee: The United States of America as represented by the Secretary of the Navy, Washington, D.C.

[21] Appl. No.: 579,711

[22] Filed: Dec. 28, 1995

[51] Int. Cl.[6] .................................................. G02B 6/255
[52] U.S. Cl. ................................................................. 385/99
[58] Field of Search ................................... 385/95, 96, 97, 385/98, 99, 147

[56] References Cited

U.S. PATENT DOCUMENTS

| | | | |
|---|---|---|---|
| 4,178,067 | 12/1979 | Johnson et al. | 385/95 |
| 4,196,965 | 4/1980 | Matsuno | 385/97 |
| 4,526,438 | 7/1985 | Essert | 385/95 |
| 4,537,468 | 8/1985 | Degoix et al. | 385/99 |
| 4,714,316 | 12/1987 | Moore et al. | 385/99 |
| 4,784,459 | 11/1988 | Jenkins | 385/99 |
| 4,946,249 | 8/1990 | Barlow et al. | 385/99 |
| 5,018,821 | 5/1991 | Kurata | 385/99 |
| 5,042,902 | 8/1991 | Huebscher et al. | 385/99 |
| 5,201,019 | 4/1993 | Gallusser et al. | 385/99 |
| 5,214,732 | 5/1993 | Beard et al. | 385/78 |
| 5,224,189 | 6/1993 | Mass et al. | 385/98 |
| 5,241,613 | 8/1993 | Li et al. | 385/96 |
| 5,249,246 | 9/1993 | Szanto | 385/99 |
| 5,257,337 | 10/1993 | Grigsby et al. | 385/95 |
| 5,315,682 | 5/1994 | Daguet et al. | 385/95 |
| 5,341,448 | 8/1994 | Huebscher | 385/97 |
| 5,367,594 | 11/1994 | Essert et al. | 385/70 |

*Primary Examiner*—Akm E. Ullah
*Attorney, Agent, or Firm*—Harvey Fendelman; Michael A. Kagan; Eric James Whitesell

[57] ABSTRACT

A fiberoptic cable junction for joining the ends of two fiberoptic cables comprises the steps of inserting a tube fastener over each cable end and inserting a protective sleeve and a splint fastener over either cable end. The cable ends are then spliced together. The protective sleeve is positioned over the splice and is supported by fastening an inner splint rod to the cable buffer with the tube fasteners. The cable buffer is supported by an outer splint rod fastened to the tube fasteners by the splint fastener.

19 Claims, 2 Drawing Sheets

FIBEROPTIC CABLE JUNCTION

BACKGROUND OF THE INVENTION

The present invention relates to joining two fiberoptic cables. More specifically, but without limitation thereto, the present invention relates to a fiberoptic cable junction suitable for submarine environments that may be assembled in the field.

Previous methods of making fiberoptic junctions have included epoxying strength members into cones and having the splice encased in a machined tube. Such designs require expensive machined parts and delicate assembly procedures. Other designs have used solder sleeves for mechanical termination. Solder sleeve designs, however, are not suitable for fiberglass strength members.

Another approach described in U.S. Pat. No. 5,315,682 uses a mechanical gripping device on steel wires to transmit mechanical tensile load. A polyethylene to polyethylene chemical bond is used to block water from electrical and optical components. This requires a plastic molding machine, which may not be practical in a field environment. In addition, this approach requires specially machined parts to house the fusion splice.

U.S. Pat. No. 5,224,189 uses mechanical connectors instead of a fusion splice to join the optical fibers and uses O-rings for blocking water. A disadvantage of this approach is that O-rings usually require expensive machined parts.

A need therefore exists for a fiberoptic cable junction that may be made in the field using off-the-shelf components.

SUMMARY OF THE INVENTION

The fiberoptic cable junction of the present invention is directed to overcoming the problems described above, and may provide further related advantages. No embodiment of the present invention described herein should be construed to preclude other embodiments or advantages that may exist or become obvious to those skilled in the art.

A fiberoptic cable junction of the present invention for joining the ends of two fiberoptic cables comprises the steps of inserting a tube fastener over each cable end and inserting a protective sleeve and a splint fastener over either cable end. The cable ends are then spliced together. The protective sleeve is positioned over the splice and is supported by fastening an inner splint rod to the cable buffer with the tube fasteners. The cable buffer is supported by an outer splint rod fastened to the tube fasteners by the splint fastener.

An advantage of the fiberoptic cable junction of the present invention is that inexpensive off-the-shelf components may be used.

Another advantage is that the fiberoptic cable junction may be done quickly in the field with a few simple tools.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
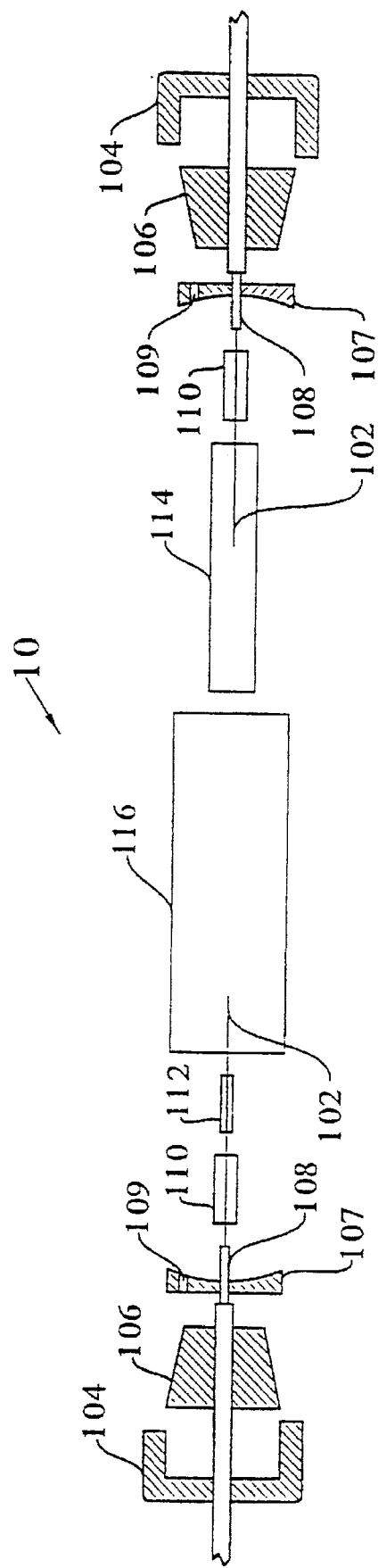
FIG. 1 is a cross-sectional view of the pre-assembled components of a fiberoptic cable junction of the present invention.

In FIG. 1, the following components of fiberoptic cable junction 10 are inserted over each end of fiberoptic cables 102 prior to splicing: an end cap 104, a tapered, flexible stopper 106, an encapsulation block 107, and a tube fastener 110. A protective sleeve 112, a splint fastener 114, and a splice enclosure 116 are then inserted over either end of fiberoptic cables 102.

Stoppers 106 may be made from a flexible material such as rubber, for example. Stoppers 106 preferably have an inside diameter sized to fit smoothly on fiberoptic cable 102 and an outside taper that fits partially inside splice enclosure 116. Tube fasteners 110 may be made of heat shrink tubing sized to fit sufficiently loosely over protective sleeve 112 and cable buffer 108 to allow positioning during assembly. Encapsulation blocks 107 may be made of, for example polyethylene plastic shaped into a thin disk sized to fit tightly within splice enclosure 116. Protective sleeve 112 may be a fiber splice sleeve of the commercial type used for fusion splicing. Splint fastener 114 may be made of heat shrink tubing sized to fit sufficiently loosely over cable buffer 108 to allow positioning during assembly. Splice enclosure 116 may be made from, for example, cylindrical clear PVC. Using a clear material facilitates inspection of fiberoptic cable junction 10 after assembly. End caps 104 may be made from, for example, PVC.

Figure 2:
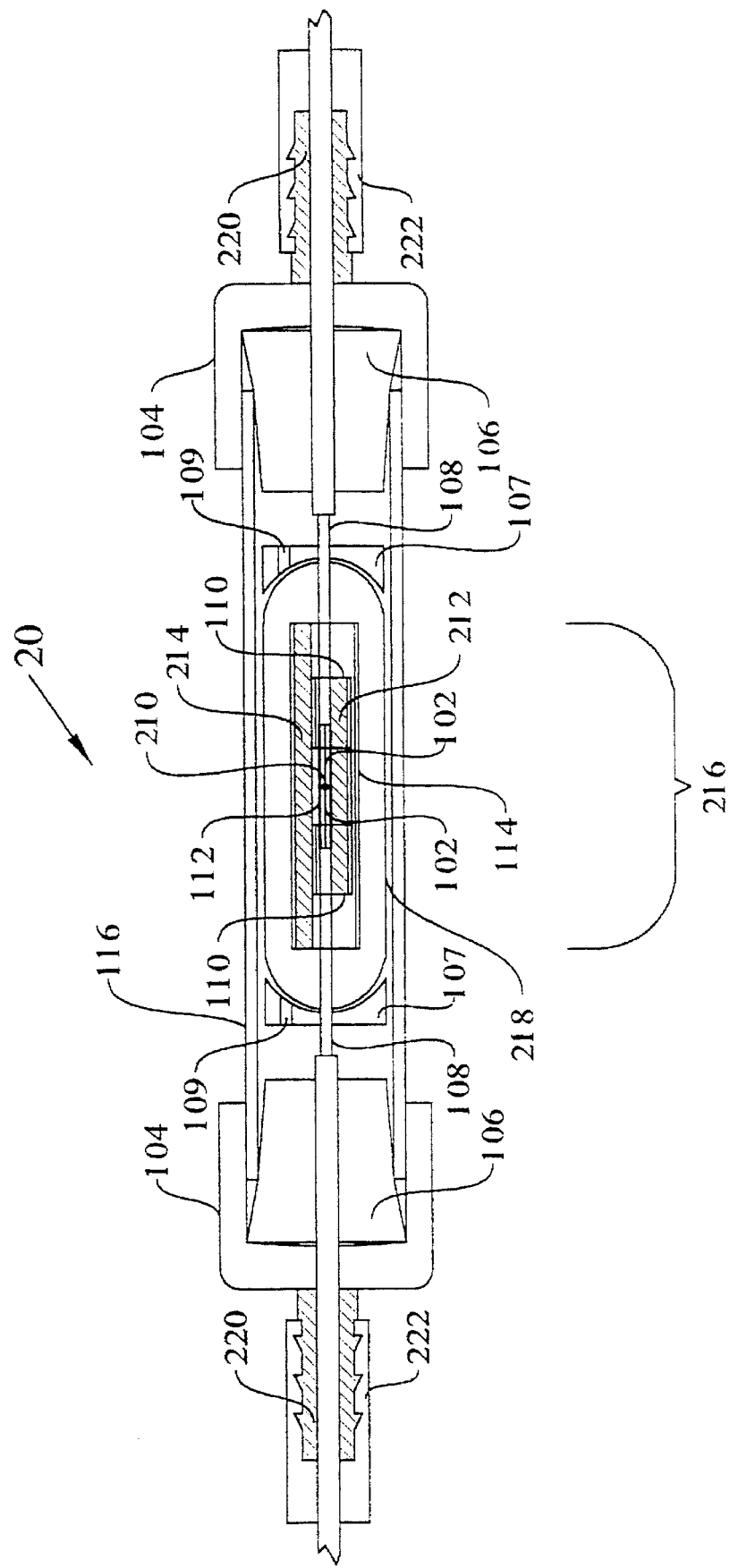
FIG. 2 is a cross-sectional view of the assembled fiberoptic cable junction of FIG. 1.

In FIG. 2, completed fiberoptic cable junction 20 is shown after joining the ends of fiberoptic cables 102 to form splice 210. Fiberoptic cables 102 may be joined by, for example, fusion splicing or mechanical splicing. Protective sleeve 112 is then positioned over splice 210. Splice 210 is supported by fastening an inner splint rod 212 to cable buffer 108 with tube fasteners 110. An outer splint rod 214 is fastened to protective sleeve 112 and tube fasteners 110 with splint fastener 114 to form a splice assembly 216. Encapsulation blocks 107 may then be positioned within splice enclosure 116 and splice assembly 216 may be encapsulated in a capsule 218 by injecting, for example, epoxy through an injection port 109 of encapsulation blocks 107. After capsule 218 has set, encapsulation blocks 107 may be removed and stoppers 106 inserted into each end of splice enclosure 116. Stoppers 106 may be secured to splice enclosure 116 with end caps 104. End caps 104 may be fastened to splice enclosure 116 by, for example, mating threads, a twist-lock coupling, or a bayonet coupling to cause stoppers 106 to be compressed against the inside wall of enclosure 116 and around fiberoptic cable 102, forming a gland seal. A hose barb 220 may also be incorporated into each of end caps 104 for attaching strain reliefs 222. Strain reliefs 222 may be made of PVC hose, for example.

Other modifications, variations, and applications of the present invention may be made in accordance with the above teachings other than as specifically described to practice the invention within the scope of the following claims.

We claim:

1. A fiberoptic cable junction comprising:

a pair of fiberoptic cables for forming a splice;

a protective sleeve operably coupled to said splice;

an inner splint; and a tube fastener operably coupled to said inner splint and to a cable buffer of said fiberoptic cables.

2. The fiberoptic cable junction of claim 1, further comprising an outer splint; and a splint fastener operably coupled to fasten said outer splint to said tube fasteners for forming a splice assembly.

3. The fiberoptic cable junction of claim 2, further comprising an encapsulation of said splice assembly.

4. The fiberoptic cable junction of claim 2, wherein said encapsulation comprises epoxy.

5. The fiberoptic cable junction of claim 2, further comprising:

a splice enclosure having opposite ends operably coupled to enclose said splice assembly;

a tapered stopper operably coupled to each of said opposite ends of said splice enclosure, respectively; and an end cap operably coupled to each of said fiberoptic cables and said stoppers for forming a gland seal between said stoppers and said splice enclosure, and between said stoppers and said fiberoptic cables, respectively.

6. The fiberoptic cable junction of claim 5, further comprising:

a hose barb operably coupled to each said end cap, respectively; and a strain relief operably coupled to each said hose barb, respectively.

7. The fiberoptic cable junction of claim 5, wherein said end caps are operably coupled to said splice enclosure by mating threads.

8. The fiberoptic cable junction of claim 5, wherein said end caps are operably coupled to said splice enclosure by a bayonet coupling.

9. The fiberoptic cable junction of claim 5, wherein said end caps are operably coupled to said splice enclosure by a twistlock coupling.

10. The fiberoptic cable junction of claim 5, wherein said splice enclosure comprises clear PVC.

11. The fiberoptic cable junction of claim 1, further comprising a light transmitter for emitting light into said fiberoptic cables.

12. The fiberoptic cable junction of claim 1, further comprising a light receiver for receiving light from said fiberoptic cables.

13. The fiberoptic cable junction of claim 1, wherein said tube fasteners comprise heat shrink tubing.

14. The fiberoptic cable junction of claim 1, wherein said splint fastener comprises heat shrink tubing.

15. A method for making a fiberoptic cable junction comprising the steps of:

(1) inserting a tube fastener over each end of a pair of fiberoptic cables;

(2) inserting a protective sleeve and a splint fastener over at least one end of the fiberoptic cables;

(3) splicing the ends of the fiberoptic cables;

(4) positioning the protective sleeve over the splice; and (5) fastening an inner splint to the rigid tubes along the protective sleeve with the tube fasteners to form a splice assembly.

16. The method of claim 15, further comprising the step of fastening an outer splint to the splice assembly with the splint fastener to form a splint assembly.

17. The method of claim 16, further comprising the step of encapsulating the splint assembly.

18. The method of claim 17, further comprising the steps of:

inserting a tapered stopper over each end of the fiberoptic cables in step (1);

inserting a splice enclosure over an end of the fiberoptic cables in step (2);

positioning the splice enclosure over the encapsulated splice assembly;

inserting the tapered stoppers in each end of the splice enclosure; and fastening the end caps to the splice enclosure over the tapered stoppers to form a gland seal between the stoppers and the splice enclosure and between the stoppers and the fiberoptic cables.

19. The method of claim 15, wherein the step of splicing the fiberoptic cables comprises at least one of fusion splicing and mechanical splicing.

* * * * *